(No Model.) 2 Sheets—Sheet 1.
T. B. HOWE.
MACHINE FOR FORMING GLASS BOTTLES.
No. 447,451. Patented Mar. 3, 1891.
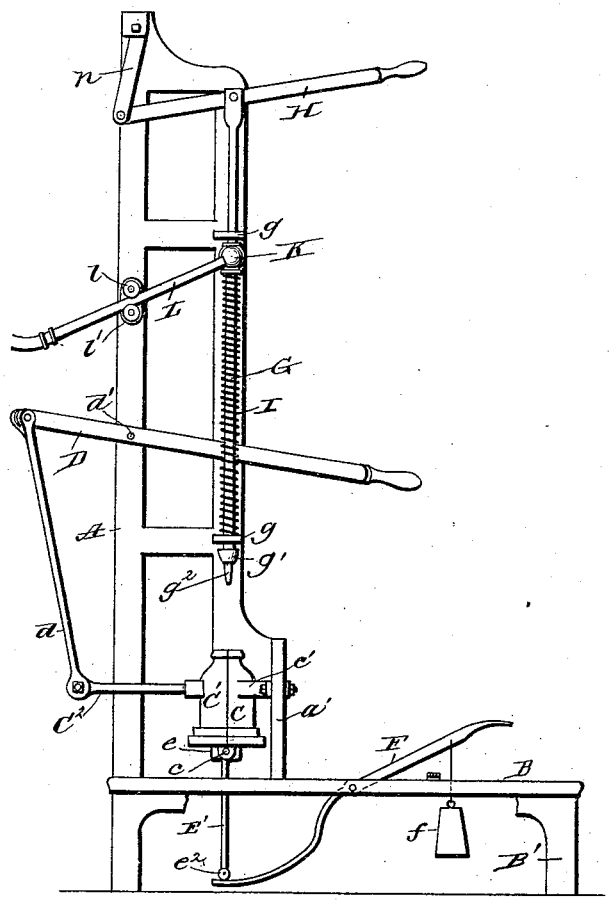
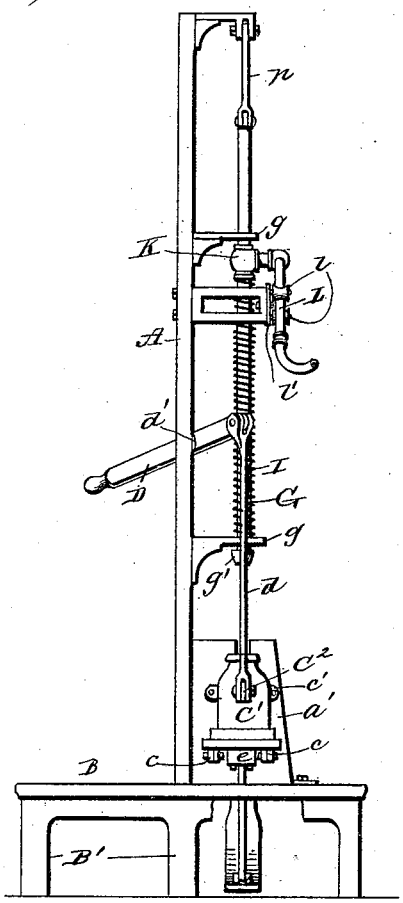
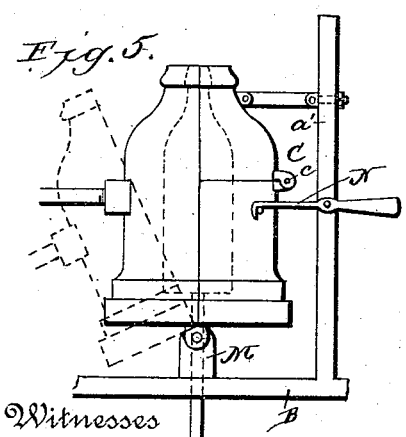
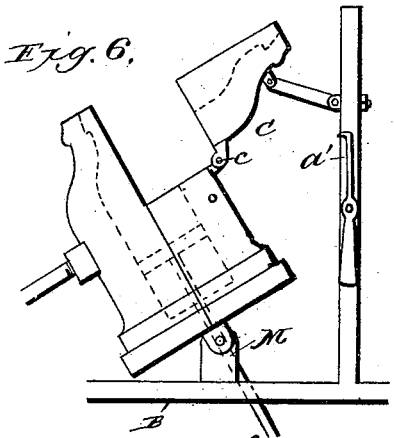
Witnesses
E. D. Smith
Thomas Durant
Inventor
Thomas B. Howe,
By his Attorneys
Church & Church (No Model.) 2 Sheets—Sheet 2.
T. B. HOWE.
MACHINE FOR FORMING GLASS BOTTLES.
No. 447,451. Patented Mar. 3, 1891.
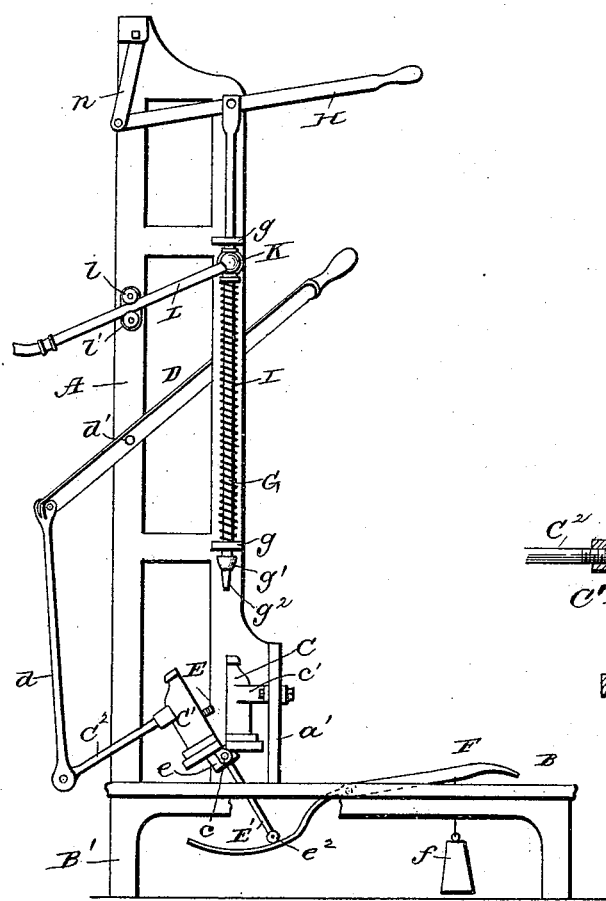
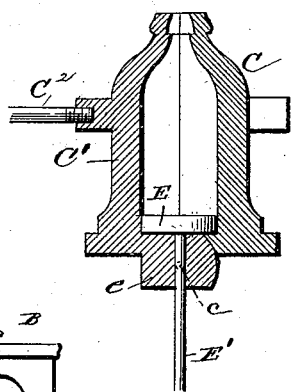
Witnesses
E. D. Smith
Thomas Durant
Inventor
Thomas B. Howe,
By his Attorneys
Church & Church

UNITED STATES PATENT OFFICE.

THOMAS B. HOWE, OF SCRANTON, PENNSYLVANIA.

MACHINE FOR FORMING GLASS BOTTLES.

SPECIFICATION forming part of Letters Patent No. 447,451, dated March 3, 1891.

Application filed May 14, 1890. Serial No. 351,780. (No model.)

*To all whom it may concern:*

Be it known that I, THOMAS B. HOWE, of Scranton, in the county of Lackawanna and State of Pennsylvania, have invented certain new and useful Improvements in Machines for Forming Glass Bottles, &c.; and I do hereby declare the following to be a full, clear, and exact description of the same, reference being had to the accompanying drawings, forming a part of this specification, and to the letters of reference marked thereon.

The object of this invention is to provide a machine for forming glass bottles and similar hollow articles at a single operation, which machine shall be simple, comparatively inexpensive, and capable of being operated with great rapidity with but few attendants.

With the above objects in view the machine may be briefly said to consist of a mold having a movable bottom with a lever for moving the same, a lever for manipulating the mold to permit of the escape or removal of the formed bottle, and a vertically-movable tubular plunger in communication with a source of air-pressure supply and adapted to enter the top of the mold to form the opening in the bottle and supply the air for forming the internal cavity.

The invention also consists in certain novel details of construction and combinations and arrangements of parts to be hereinafter described, and pointed out particularly in the claims at the end of this specification.

Referring to the accompanying drawings, Figure 1 is a side elevation of a machine constructed in accordance with my invention. Fig. 2 is a similar view with the mold open. Fig. 3 is a front elevation. Fig. 4 is a detail section through the mold shown in the previous figures. Fig. 5 is a side elevation of a modified form of mold shown open in dotted lines. Fig. 6 is a view of the same with the top section of the mold open.

Similar letters of reference in the several figures indicate the same parts.

A indicates the upright frame of the machine upon which most of the operating parts are supported. Said frame is preferably cast-iron of any light design, mounted on a bed or base plate B, preferably having legs B', which elevate it above the floor to bring the mold in convenient position and afford room for the operation of the parts beneath the bed-plate.

At the bottom of the frame A in rear of the machine is a support $a'$ for the mold, which latter is divided longitudinally and the halves hinged together at the bottom by hinges $c\ c$, the rear half C of the mold being secured rigidly to the support by brackets or posts $c'$. To the front half C' an arm $C^2$ is secured, which in turn is connected by the link $d$ with the rear end of the operating hand-lever D, pivoted on the frame at $d'$. Thus when the hand-lever is moved up or down the mold will be opened or closed, as will be readily understood by reference to Figs. 1 and 2, and the bottles formed within the same may be readily removed, &c.

The mold is provided with an internal piston-bottom E, carried by a rod E', working through a guide $e$, preferably on the bottom of the movable section and consequently causing the piston-bottom to move with the said section when the mold is opened. This piston-bottom is adapted to press the glass up into the top of the mold to form the neck and top of the bottle and also to gage the amount of glass poured into the mold, as will hereinafter more fully appear, being operated for this purpose by means of the foot-lever F, pivoted on the base-plate and having a broad forward end, on which the two friction-wheels $e^2$ on the rod rest, and a counterweight $f$ on the rear end to assist the operator in moving the piston-bottom.

Mounted and sliding in bearings $g$ on the frame immediately over or in line with the opening in the top of the mold is a tubular plunger G, having a plug $g'$, and an extension $g^2$ on the lower end, the former serving to close the mouth of the mold when the plunger is depressed and the latter to give the proper size to the throat of the bottle.

A hand-lever H is connected to the upper end of the plunger and pivotally connected to the frame by a link $h$, enabling the said plunger to be easily and quickly depressed, a coiled spring I, working between one of the guides, and a collar on the plunger serving to return it to normal position when the hand-lever is released.

Air is introduced into the glass within the mold through the tubular plunger and extension $g^2$, the plunger being for this purpose put into communication with a suitable air-pressure supply of any ordinary construction, preferably through the medium of a valve, which automatically closes as the plunger is elevated and opens as the plunger reaches its lowest position. In the preferred construction a simple cut-off valve K is employed, to which is connected a short section of tube L, working between rollers $l$ on the swivel $l'$ on a bracket secured to the frame, the ports in the valve being arranged to close as the plunger rises and the valve is moved by the tube with relation thereto, and vice versa.

With an apparatus as thus described the operation of forming a bottle is very simple, and is as follows: Assuming that the glass has been poured in, the plunger is depressed and the piston-bottom elevated to press the glass into the top of the mold and give the mouth of the bottle the proper shape. Then while holding the plunger down the operator relieves the pressure on the foot-lever and permits the piston-bottom to descend under the influence of the compressed air and weight of the melted glass. By the time the bottom has been reached the bottle is cool enough to be removed, and the operator grasps the handle and opens the mold, if necessary, at the same time depressing the foot-lever to elevate and discharge the bottle, when the mold is ready for another charge.

It is obvious that other forms of molds may be substituted for the one just described—for instance, the preferred form shown in Figs. 5 and 6, which while embodying the same principles involved in the former mold has a further advantage in that the side C is divided in the middle and the two parts hinged together at $c$, the upper half being connected by a link with the support $a'$ and the whole mold being supported by and hinged to the legs M on the base or an extension thereof. With this form of mold a catch or hook N is employed to retain the halves C in upright position while the bottle is being formed, after which the catch is tripped and the halves C thrown into the position shown in Fig. 6, forming a cup at the bottom for the reception of the melted glass, which latter may be easily placed within so large a recess, and the height of the piston serving to gage the amount of glass, the mold being then closed and the operations before mentioned gone through with.

Having thus described my invention, what I claim as new is—

1. In a bottle-forming machine, the combination, with the vertically-movable tubular plunger connected to an air-supply adapted to enter the mold, and the lever for operating the same, of the separable mold composed of the halves hinged together at the bottom, one half connected to the frame and the other carrying the mold-bottom and connected to an operating-lever, whereby the mold can be opened and the bottle resting on one half turned to one side by a single operation, substantially as described.

2. In a bottle-forming machine, the combination, with the separable mold hinged together at the bottom, having one half connected to the frame and the hand-lever connected to the opposite side, of the movable piston-bottom within the mold, having the stem passing through a guide on the swinging section of the mold, whereby the bottom is caused to move with the same, an independent lever for elevating the bottom, and the vertically-movable tubular plunger in communication with the air-pressure supply working in bearings above the mold and adapted to fit within and close the mouth of the mold, substantially as described.

3. In a bottle-forming machine, the combination, with the mold and the vertically-movable tubular plunger working in bearings above the mold in communication with the source of air-pressure supply and adapted when depressed to close the mouth of the mold, of a valve controlling a passage of air through said tubular plunger, operated by the movement thereof to turn on the air-pressure when the plunger is depressed and cut off the air-pressure when the plunger is elevated, substantially as described.

4. In a bottle-forming machine, the combination, with the mold and the vertically-movable plunger working in bearings above the same and adapted when depressed to close the mouth of the mold, of the air-pressure-supply pipe, and a valve for automatically opening and cutting off the supply of air, interposed between said pipe and plunger, substantially as described.

5. In a bottle-forming machine, the combination, with the mold and the vertically-movable tubular plunger mounted in bearings above the mold, of the air-pressure-supply pipe communicating with the plunger and mounted on a pivotal support, and a valve connected to and controlled by said air-pressure-supply pipe, whereby air is admitted when the plunger descends and is cut off as the plunger ascends, substantially as described.

6. In a bottle-forming machine, the combination, with the mold and the vertically-movable tubular plunger mounted in bearings above the mold, of the air-pressure-supply pipe communicating with said plunger, and the rollers between which said pipe passes, mounted on a swivel base, and a valve connected to and controlled by said pipe for regulating the admission of air to the plunger, substantially as described.

7. In a bottle-forming machine, the combination, with the frame, the mold divided vertically into halves hinged together at the bottom, and one of said halves divided horizontally into two parts hinged together, with the upper section connected to the frame by a link, of the hand-lever connected to the other half for opening the mold, substantially as described.

8. In a bottle-forming machine, the combination, with the frame, the mold divided vertically into halves hinged together at the bottom, and one of said halves divided horizontally into two parts hinged together, with the upper section connected to the frame by a link, of the hand-lever connected to the other half for opening the mold, and the vertically-movable piston-bottom within the mold, whereby the amount of glass inserted may be gaged, substantially as described.

9. In a bottle-forming machine, the combination, with the frame, the mold divided vertically into halves hinged together at the bottom, and one of said halves divided horizontally into two parts hinged together, a link connecting the upper section of said half and the frame, and a catch for holding the lower section in vertical position, of a hand-lever connected to the other half and a vertically-movable piston-bottom within the mold, substantially as described.

10. In a bottle-forming machine, the combination, with the separable mold composed of two sections hinged together at the bottom and a hand-lever pivoted to the frame and one of the mold-sections for opening the latter, of the vertically-movable plunger operating in bearings above the mold, the hand-lever pivoted thereto, and a link connecting said lever and the frame, the air-pressure-supply pipe communicating with the plunger and the foot-lever for elevating the piston-bottom, substantially as described.

THOMAS B. HOWE.

Witnesses:
EDW. C. DIMMICK,
JAS. E. CARMALT.